United States Patent [19]
Horai, Jr. et al.

[11] 3,888,683
[45] June 10, 1975

[54] NOVEL ALGICIDAL POST TREATED ROOFING GRANULES

[75] Inventors: John C. Horai, Jr.; David C. Little, both of Hagerstown, Md.

[73] Assignee: GAF Corporation, New York, N.Y.

[22] Filed: Oct. 25, 1972

[21] Appl. No.: 300,853

[52] U.S. Cl. .................. 106/15 AF; 428/404; 71/67
[51] Int. Cl. ............................................... C09k 3/00
[58] Field of Search .......... 117/100 D, 27, 70 S, 87, 117/88, 32, 140 A; 106/15 AF

[56] References Cited
UNITED STATES PATENTS
3,255,031   6/1966   Lodge et al. ........................... 117/27

*Primary Examiner*—William D. Martin
*Assistant Examiner*—Dennis C. Konopacki
*Attorney, Agent, or Firm*—Walter C, Kehm; Joshua J. Ward

[57] ABSTRACT

Algicidal properties are imparted to conventional color coated roofing granules by incorporating copper silicate with the processing oil conventionally employed in the post-treatment of such color coated roofing granules. The copper silicate employed has a particle size not exceeding about 100 mesh, preferably less than about 200 mesh, and more particularly having a particle size not exceeding about 325 mesh. The processing oil, having a viscosity of about 100–500 SUS measured at 100°F and present in an amount generally of about ¼ to about 1½ gallons per ton of base granules, forms a thin film on the surface of the coated granules, with a portion of said oil generally being absorbed into the color coating and possibly into the base granules themselves. The copper silicate adheres to the surface of the granule color coating, with the finer particles thereof being adsorbed into the color coat with the processing oil.

25 Claims, No Drawings

NOVEL ALGICIDAL POST TREATED ROOFING GRANULES

BACKGROUND OF THE INVENTION

1. Field of the Invention

This invention relates to roofing granules having algicidal properties. More particularly, it relates to an economical method for producing novel color coated roofing granules possessing algicidal properties for effectively retarding the biological growth of algae and/or fungi on roofing surfaces.

2. Description of the Prior Art

Roofing granules, both natural and artificially color-coated granules, are extensively used in roll roofing and asphalt shingle compositions. The roofing granules are generally embedded in the asphalt coating on the surface of an asphalt-impregnated felt base material, the granules thus forming a coating that provides an adherent, weather-resistant exterior roofing surface. As this outer granule coating also provides the esthetic effect observable with respect to the roofing composition, the appearance of the granules is of major marketing interest. For this reason, therefore, a pigmented color coat is ordinarily applied to the base mineral granules to enhance their visual, decorative effect.

As white or light-colored roofs are particularly favored in warmer climates, $TiO_2$ pigment is commonly used in the production of light color-coated roofing granules. In such warmer climates, as in the southern part of the United States, discoloration of asphalt roofing compositions by the growth of algae and/or fungi is of particular concern. Such discoloration, of course, is particularly noticeable on the white or light-colored roofs otherwise so desired and popular in such regions. Upon discoloration, the roof becomes unsightly in appearance and is found to cause a greater heat absorbence as, for example, when a white roof is turned dark brown or black in a period of a few years in use.

Nor is this problem, so widespread in areas such as the southern United States, particularly the gulf state area, confined necessarily to such regions. Thus, discoloration of roofing surfaces by the growth of algae and/or fungi has also been found in the northern part of the United States, particularly so in areas along rivers and lakes and along the northern coastal regions. While home owners and others have been aware of this discoloration problem for many years, effective, practical solutions thereto have not been forthcoming at a reasonable cost. The problem of roofing granule discoloration, therefore, has remained a major marketing problem for the roofing industry.

For many ears, this problem of roofing granule discoloration was believed to be caused only by fungi, as is the case with respect to some outdoor paint surfaces. Many different types of fungi have, in fact, been isolated from discolored roofing surfaces. More recently, however, it has been learned that other organisms contribute principally to this discoloration and have been identified as terrestrial blue-green algae of the Cyanophyta division. Such algae are transferred through the air as spores and/or vegetative matter and deposited on roofing surfaces where they thrive and grow. Natural pigments produced by the algae add to the dark discoloration of the roof, which is generally first noticeable in spots that develop into dark vertical streaks that gradually darken until the entire roof becomes a totally discolored black within five to fifteen years. Predominant algae thus identified from infested roofing shingles include *Gloeocapsa Magma*, *Tolypothrix Byssoidea*, *Nostoc sp.* and *Scytonema sp.* In general, metallic algicides that are effective in retarding the biological growth of such algae are likewise effective in similarly retarding the growth of fungi. The incorporation of a metallic algicide in the color coat of roofing granules, therefore, has heretofore been proposed in order to inhibit or prevent the discoloration of roofing surfaces containing such granules as a result of algae and/or fungi growth.

The incorporation of a metallic copper algicide in the color coat of roofing granules was disclosed in the Skadulis patent, U.S. Pat. No. 3,528,842. Skadulis particularly proposes the incorporation of copper algicides that are substantially waterinsoluble but that have limited solubility in acidic solutions, e.g. $CT_2O$. Highly water-soluble copper algicides, such as $CuSO_4$, were indicated as being ineffective for this application since it was suggested that such algicides would be leached out of the color coat very rapidly, i.e. within a few months, so that the resistance to algae growth and roofing discoloration would not be effective over any reasonable length of time. Skadulis also indicated that virtually water-insoluble compounds, such as $CuO$, would not be effective because, it was suggested, of insufficient solubility thereof in rainwater and dew (Column 2, lines 24–44). Similarly, slightly soluble zinc algicides were disclosed for incorporation in the color coat of roofing granules in the McMahon patent, U.S. Pat. No. 3,507,676. As was pointed out in the McMahon patent in Column 2, lines 58–65, such zinc algicides are effective when employed in an amount constituting at least about 1 percent by weight of the base mineral granules, i.e. about 20 lbs. of the zinc algicide compound or metal per ton of granules.

The incorporation of particular copper or zinc algicides in the color coat of roofing granules, in the manner and in the quantities taught by the Skadulis and McMahon patents, imparts a desirable resistance of roofing surfaces containing such granules to discoloration upon exposure to atmospheric weathering. The teachings of these patents, however, have not led to the development, commercial availability and use of algicidal roofing granules providing the desired degree of algae and/or fungi resistance over an extended period of time at economically competitive cost. In part, of course, this unavailability of a totally satisfactory algicidal roofing granule reflects the continual desire in the roofing industry for a more effective algicidal effect from a roofing granule of ever diminishing incremental cost to achieve such an algicidal effect. Any incorporation of metallic algicides in an otherwise conventional roofing granule coating in order to achieve the necessary or desirable algicidal effect necessarily adds an incremental cost to the roofing granule and to the roofing material incorporating such an algicidal granule. While the desired toxic effect is a necessary or highly desirable feature of the algicidal roofing granule, the providing of this property or function is an expense item that, from a marketing viewpoint, must be minimized to the fullest possible extent. The use of minimum quantities of metallic algicides to produce a desired level of effectiveness over an extended period of time is, therefore, highly desirable. While the prior techniques have imparted an algicidal effect to roofing granules, an enhanced effect would provide further assurance of the desired toxic effect, thereby enhancing the quality of such granules. In this regard, it should be noted that the algicidal granules of McMahon require the incorporation of a relatively large amount of zinc for effective algicidal action as noted above. as As mount of metallic algicide required for effective action increases, the cost of the resulting algicidal granule is directly increased thereby. In addition, the use of relatively large amounts of metallic algicides frequently requires the incorporation of pigment in the granule coating in amounts in excess of that other wise required to achieve a desired roofing granule color. As the amount of $Cu_2O$ employed is increased, for example, the amount of $TiO_2$ pigment that must be employed in the granule coating composition to produce a white roofing granule is also generally increased. Such an additional requirement necessarily adds to the overall cost of the algicidal roofing granule product and of roofing materials made therefrom.

The requirements flowing from the assumptions and teachings of the prior art tend to limit or restrict the metallic algicidal materials to be employed in a manner not necessarily consistent with the economic availability and feasibility of such materials in any particular application. Optimum flexibility as to the metallic algicides employed is, in other words, another desirable aspect for the providing of an economically attractive algicidal roofing granule to the roofing industry. One further troublesome aspect of previous efforts to impart algicidal properties to roofing granules has been the practical necessity for producing such algicidal roofing granules as a separate production operation apart from the production of conventional, non-algicidal, color-coated roofing granules because of the variation in the color coating formulation necessarily required to incorporate the algicidal compound into the color coating. As the vast preponderance of roofing granules presently manufactured are of conventional, non-algicidal character, the interruption of such conventional roofing granule production and the scheduling and inventory problems associated therewith all tend to create a further economic disadvantage associated with the production and marketing of algicidal roofing granules. As hereinabove indicated, the commercial acceptance and use of algicidal roofing granules depend upon the providing of an economically acceptable balance between algicidal effectiveness and the incremental cost required to achieve such algicidal properties as compared with the cost of conventional roofing granules, all taken in light of the degree of algicidal effectiveness achieved. In light of these factors, the requirements for the production of algicidal roofing granules in accordance with the teachings of the prior art constitute a further detrimental element serving to diminish the prospects for employing algicidal roofing granules despite the genuine need for algicidal control and an improved resistance of roofing surfaces to discoloration during extended periods of exposure to atmospheric weathering.

It is an object of the present invention, therefore, to provide improved algicidal roofing granules.

It is another object of the invention to provide an improved process for the production of such algicidal roofing granules.

It is another object of the invention to provide algicidal roofing granules having effective algicidal properties at economically acceptable levels of metallic algicide content.

It is another object of the invention to provide a process for the production of roofing granules having enhanced flexibility and compatibility with respect to the conventional production of color coated roofing granules.

It is another object of the invention to provide an algicidal roofing granule with minimal incremental pigment loading requirements to compensate for variation in color due to the presence of the algicidal material.

It is a further object of the invention to provide roofing surfaces having an enhanced resistance to discoloration during extended periods of exposure to atmospheric weathering.

With these and other objects in mind, the present invention is hereinafter set forth in detail, the novel features thereof being particularly pointed out in the appended claims.

SUMMARY OF THE INVENTION

Color coated roofing granules capable of inhibiting or preventing the growth of discoloring algae and/or fungi organisms upon exposure of roofing surfaces containing such granules to atmospheric weathering have a conventional color coating on the base mineral granules, with a conventional processing oil forming a thin film on the surface of the coated granules and copper silicate, alone or in combination with metallic algicides, in the oil film and adhering to the surface of the granule coating by electrostatic and/or mechanical adhesive forces. The algicidal materials are applied to conventionally color coated granules by incorporation with the processing oil that is mixed with the color coated granules in an other wise conventional post-treatment operation. The algicidal materials will have a particle size not exceeding about 100 mesh, with the particle size thereof being preferably less than about 200 mesh, or preferably with the major proportion or substantially all of said algicides having a particle size of less than 325 mesh. A portion of the processing oil applied to the color coated granules may be absorbed into the color coating and into the base mineral granules themselves. The finer sized particles of copper silicate and metallic algicides employed may also be adsorbed into the granule color coating.

Upon incorporation of the algicidal roofing granules of the present invention into asphaltic roofing compositions and exposure to atmospheric weathering, the processing oil will weather away and decompose as in conventional roofing granule applications. The algicidal materials, however, are found to be retained on the surface of the roofing granules and are not dislodged or loosened therefrom as the processing oil weathers away. During periods of rain and dew, the algicides are ionized to form metallic algicidal ions. These metallic algicidal ions are slowly released from the surface of the roofing granules and are leached over the roofing surface, providing a toxic effect that retards or prohibits the biological growth of algae and/or fungi. This slow release of algicidal ions is found to operate over extended periods of time, even upon exposure under severe conditions of atmospheric weathering, thus enhancing the resistance of the roofing surfaces containing such granules to algae and/or fungi over the reasonable life of the roofing surface.

The production of the roofing granules of the invention does not necessitate any disruption of conventional production of color coated roofing granules. The copper silicate and metallic algicides employed can readily be incorporated with the processing oil or eliminated therefrom during the usual post-treatment operation, thereby minimizing the processing operations, scheduling problems, and handling costs heretofore associated with the production of an algicidal roofing granule. Highly desirable production flexibility is thus achieved. Relatively small amounts of the relatively inexpensive copper silicate are highly effective in producing a commercially desirable algicidal roofing granule combining effective inhibitioc of the biological growth of algae and/or fungi with minimal incremental cost and processing requirements to achieve the desired algicidal properties. A major additional advantage associated with the production of white roofing granules is the relatively light color of the copper silicate, minimizing the amount of $TiO_2$ or other desired pigment component of the color coating to assure the desired light granule coloration.

DETAILED DESCRIPTION OF THE INVENTION

In the practice of the present invention, highly desirable algicidal properties are imparted to color coated roofing granules in a convenient, economical and highly effective manner. Roofing surfaces containing the novel algicidal granules of the invention release algicidal ions slowly over an extended period of time during periods of rain upon exposure to atmospheric weathering. The roofing surface is thereby rendered resistant to unsightly discoloration due to infestation and growth of algae and/or fungi. This highly desirable feature is accomplished at economically acceptable algicidal content levels and overall roofing granule cost, with minimum departure from conventional roofing granule production operations. The algicidal properties of the roofing granules of the invention are effective over extended periods of time and are particularly suitable in humid environments normally conducive to the growth of algae and/or fungi.

The algicidal roofing granules of the present invention are prepared by the post-treatment of conventional color coated roofing granules. As with conventional roofing granules, therefore, any suitable base raw mineral granules, such as greenstone or netheline syenite may be used. In conventional production of artificially colored roofing granules, an alkali metal silicate-clay coating is applied to the base mineral granules and fired to produce a moisture permeable, substantially water insoluble, durable, pigmented coating on the base mineral granules. Two general methods are commonly employed for color coating such base mineral granules, both of which can be employed in the practice of the present invention. In one such method, referred to as the continuous paint slurry process, crushed and screen graded mineral granules are constantly mixed with a paint slurry containing pigments, clay and sodium silicate in suitable mixing equipment. The thus color-coated granules are then heated to a temperature that may range from about 600° to about 1,200°F in a rotary-type kiln. Dehydration of the silicate occurs, and an extremely hard color-coated granule is obtained. In the event that the granules are fired at lower temperatures, e.g. about 500°F, the silicate-clay coating may require treatment by the addition of a pickling agent, such as $AlCl_3$ solution, in order to properly insolubilize the coating. Upon cooling, the color coated granules are generally post treated with processing oil and/or coating compositions as is known in the art.

In another batch-type process essentially the same coating, firing and post treatment operations are performed except that a weighed amount of crushed and screen graded base mineral granules is mixed with a weighed amount of pigments and clay, and the silicate is added to this premix in a suitable mixer, commonly a tumbling barrel-type mixer. The firing and post treatment of the color coated granules are as referred to above with respect to the continuous process. It is, of course, within the scope of the present invention to provide the color coating on the base mineral granules by any desirable modification of these techniques, or by any other conventional color coating operation. It will also be understood that the present invention for imparting algicidal properties to conventional color coated roofing granules during the post-treatment thereof can be employed regardless of the number of such color coatings applied to the base mineral granules.

Following the post-treatment operation in which algicidal properties are imparted to the roofing granules as herein provided, the resulting novel algicidal roofing granules are incorporated in otherwise conventional asphaltic roofing compositions, such as roofing shingles, rolled roofing, and the like. Such roofing compositions typically have an organic asphalt-saturated felt base that is coated with an asphalt of a higher softening point and surfaced with color coated roofing granules, such as conventional non-algicidal roofing granules, or, in the practice of the present invention, the novel algicidal roofing granules herein provided. The felt layer is customarily composed of wood fibers, either alone or in combination with paper pulp, repulped paper and/or rags, asbestos fibers, or the like. Such felts are generally referred to in the industry as roofing felts. The saturants most commonly employed to saturate the felt layer include residual oil, soft residual asphalt and soft blown petroleum asphalt, and mixtures thereof. Preferred saturants generally have a ring and ball softening point of approximately 120° to 130°F and a penetration of approximately 60 at 77°F.

This saturated felt layer is ten coated with an asphalt of a higher softening point and lower penetration than that of the saturant. Preferred materials will generally have a ring and ball softening point of approximately 175° to 260°F and a penetration of approximately 10 to 50 at 77°F. Coating asphalts of this type include native and sludge asphalts, fatty acid pitches and the like. In accordance with customary practices in the art, this asphalt coating layer is frequently embedded with powdered or fibrous fillers of inorganic or organic origin, such as powdered silica (sand), limestone, slate dust, clay, etc., and mixtures thereof. Upon application of the asphalt coating to the saturated felt layer, the color coated roofing granules post treated in accordance with the present invention to impart algicidal properties thereto are applied to the asphalt layer surface, and the resulting roofing surface is then passed through suitable rollers and presses, quenched and otherwise treated and handled in accordance with conventional practice in the roofing industry. It will be appreciated that numerous variations in the production of the desired roofing compositions and in the additive materials employed are well known in the art and can be employed within the scope of the present invention.

In the conventional production of non-algicidal roofing granules, the coated and fired granules having a hard, durable, tight, weather resistant, water insolubilized color coating is post treated by mixing with a suitable treatment oil, commonly a conventional processing oil alone or in combination with other conventional coating compositions, such as a silicone coater. This post treatment with processing oil provides useful properties that facilitate the storage, handling and use of the roofing granules and their subsequent effectiveness in asphaltic roofing compositions. Thus, post treating the roofing granules serves to lubricate the granules, improving their flow characteristics and handling properties during passage from the production area into transport cars, from such cars into storage bin, and the like. The lubrication of the roofing granules also minimizes undesired attrition of the color coating during transport and other handling, thereby likewise minimizing the formation of undesired dust during such transport, storage and handling. Post treatment of the color coated roofing granules with processing oil also has been found to promote the desired adhesion of the roofing granules to the roofing felt by providing a better bonding between the asphaltic coating thereof and the roofing granules. In addition, the processing oil also tends to retard any tendency of the color coating to blister, such blistering being undesired as it reduces the weather resistant characteristics of the granules during extended exposure of the granules to atmospheric weathering when employed in such roofing compositions.

The advantages achieved by the post treatment of conventional, non-algicidal roofing granules with processing oils and/or other coating compositions are likewise achieved by the post treatment of roofing granules in accordance with the present invention. The mixing of copper silicate with the roofing granules and post treatment processing oil and the resultant adherence of said copper silicate to the surface of the roofing granules, as herein provided, imparts highly desirable algicidal properties to the roofing granules without, in any way, diminishing the benefits otherwise achieved in conventional post treatment of roofing granules. The processing oil employed in the post-treatment operation of the present invention can thus be any of the conventional processing oils commonly available in the art and suitable in conventional post treatment of roofing granules. Such processing oils are typically petroleum oils of three general types, namely (1) paraffin oils, (2) naphthenic oils and (3) aromatic oils or mixtures thereof. Processing oils characterized by having a predominant number of paraffin chain carbons, i.e. 55% Cp or more, are generally considered as paraffin oils. Naphthenic oils are processing oils generally characterized by having a large number of naphthene ring carbons, i.e. 35% or more Cn. Aromatic oils, on the other hand, are generally processing oils having a large number of aromatic ring carbons, .i.e. 35% Ca or more. It will be understood that the conventional processing oils employed may properly be characterized by a combination of such properties, as in an aromatic-paraffinic oil. Such conventional processing oils generally have a viscosity within the range of from about 100 to about 500 SUS at 100°F. While lighter oils having a viscosity of from about 100 to about 300 SUS at 100°F can be employed, oils having a viscosity of generally from about 300 to about 500 SUS at said 100°F in that such oils have adequate processing characteristics and tend to facilitate the adherence of the algicidal compounds to the surface of the roofing granules. In addition, such somewhat heavier oils are weathered away at a slower rate, so as to extend the period of time during which the processing oil is effective in enhancing the overall properties of the roofing granules during use in roofing compositions. Heavier oils, having viscosities up to about 950 SUS, can also be employed, such heavier oils enhancing the adherence of the algicides to the granules, thereby minimizing undesired wash-off of such algicides. Representative illustrative examples of suitable processing oils are Texaco 659 process oil having a viscosity of 300 SUS at 100°F and a Clay/Gel analysis of 83.3 percent saturants, 16.1 percent aromatics and 0.6 percent polar compound; Coray 50 (1507) Granule Oil manufactured by Humble Oil Refining Co., having a viscosity of 304 SUS at 100°F, an aniline point of 183.7, and a refractor's index at 20°C of 1.5007; Sunthene 310 process oil manufactured by Sun Oil Company, having a viscosity of 110 SUS at 100°F and a Clay/Gel molecular-type analysis of 29 wt. percent aromatics, 70 wt. percent saturants, and 1.0 wt. percent polar compounds. It will be appreciated, however, that numerous other commercially available processing oils can be used in the practice of the present invention.

The precessing oils employed in the post-treatment operation of the present invention are generally employed in an amount within the range of from about ¼ to about 1½ gallons per ton of base mineral granules employed. At lesser amounts, sufficient oil for proper coating of the granules may not be available, and as the amount of processing oil is increased beyond the upper level generally indicated, the additional oil is not required for effective results and a tendency for blistering the asphaltic coating of the roofing composition in which the granules are employed is introduced. In general, entirely satisfactory results can be obtained by employing the processing oil in an amount within the range of from about ½ to about ¾ gallon per ton of base mineral granules employed. It will be understood that other conventional coating compositions, such as a conventional silicone coater composition, can also be employed in the post-treatment operation of the present invention to enhance the adherence of the metallic algicides to the roofing granules and for such additional purposes that such known coating compositions might optionally be employed in the conventional post treatment of non-algicidal roofing granules. Reactive silicone monomers such as methyltriethoxysilane or methyltrimethoxysilane, capable of polymerizing upon contact with moisture, can be dissolved to a disired concentration, e.g. of about 10to 100 percent by weight, in methanol, ethanol, trichloroethane or other suitable solvents. A silane composition of from about 10 to 100 percent by weight solution of methyltriethoxysilane containing about ⅔ monomer and ⅓ polymer by weight in the same solvent is other illustrative silicone coating composition that can be used with the processing oil in the practice of the present invention. Another suitable silicone monomer is methyltrichlorosilane applied either in its 100 percent concentrated form or in solution in toluene, benzene, ethyl acetate or any other suitable solvent at any appropriate concentration, e.g., about 10–30 percent by weight of solution. Such silicone additives may be advantageously employed in amounts generally from about 1 to about 25 percent by weight based on the total weight of the processing oil composition employed in the post-treatment operation of the invention. The post-treatment oil containing such silicone or other conventional additives provides the benefits herein indicated for which granule post treatment is ordinarily employed, and acts as a carrier for the algicidal material incorporated in the post-treatment operation in accordance with the teachings of the invention. When employed, the conventional silicone coater additive serves to enhance the adherence of the algicidal particles to the surface of the color coated granules.

The conventional processing oil, alone or with other desired components, is mixed with natural or color-coated roofing granules in a suitable mixing device, e.g., a rotary mixer, for a sufficient period of time to assure adequate contact of the processing oil composition with the roofing granules being post treated. The amount of time required for this purpose will, of course, be determined by the operating parameters of any particular application, but in any event is accomplished in a rapid, expedient manner. In particular applications, for example, processing oil has been fed to a rotary mixer at the rate of about 20 lbs. per hour, with a 2 minute mixing time being sufficient for adequate coverage of the roofing granules mixed therewith in the proportions generally indicated above.

In the conventional post treatment of roofing granules and in the modified post treatment operation of the present invention, the processing oil forms a thin film on the surface of the color coated roofing granules. In addition, a portion of the processing oil is absorbed into the color coating on the base mineral granules. In some instances, a portion of the processing oil may also be absorbed into the base mineral granules themselves. The processing oil forming the thin film on the surface of the granules and that absorbed into the color coating and possibly the base granules and the asphaltic base eventually weather away and decompose upon exposure to atmospheric weathering over a period of time likely ranging from about a ½ to about 2–3 years. This weathering and decomposition of the post treatment processing oil occurs with respect to the algicidal roofing granules of the present invention in the same manner as with respect to conventional roofing granules. It has been unexpectedly determined, however, that this weathering away of the post treatment processing oil does not result in any appreciable tendency of the algicidal compounds on the surface of the roofing granules to erode mechanically upon exposure to wind and rain as would heretofore be expected. To the contrary, the copper silicate of the invention and metallic algicidal materials used therewith are found to adhere to the roofing granules in a manner not adversely effected by the weathering away of the processing oil with which it was originally mixed so as to continue serving as effective algicidal materials long after the processing oil has weathered away. It is this ability of the algicidal materials to effectively operate over extended periods of time upon atmospheric exposure that serves as the basis for the novel process of the present invention and the novel algicidal roofing granules obtained thereby.

In the production of the algicidal roofing granules of the present invention, the algicidal materials employed are mixed with the color coated roofing granules and with the conventional processing oil composition in any convenient mixing device suitable in conventional post-treatment operations. If desired, the algicides can be premixed with the processing oil before mixing thereof with the coated roofing granules. It should also be noted that, in accordance with conventional practice, the processing oil can be heated in order to enhance the flow characteristics thereof, thus assuring adequate contact and coverage of the processing oil with the color coated granules upon mixing therewith in the granule post-treatment operation. The processing oil is commonly heated to a temperature of from about 150° to about 250°F for this purpose.

The imparting of algicidal properties to roofing granules in accordance with the practice of the present invention can be seen to harmonize advantageously with the conventional production of artificially colored roofing granules and the conventional post-treatment thereof. No disruption of the color coating operations is required, and the simple addition of metallic algicidal materials in the granule-processing oil mixing action of the post-treatment operation requires a minimal adjustment of ordinary, conventional operations. The present invention also permits, in a convenient manner, the production flexibility of producing either conventional color coated roofing granules or the algicidal roofing granules of the present invention as required to meet marketing requirements. The present invention also provides a high degree of flexibility with respect to the metallic algicidal material or materials that can be employed together with the subject copper silicate to impart the desired algicidal properties to the roofing granules. The metallic algicidal compounds thus employed may be any of the available metallic materials generally known as possessing algicidal properties and that, when employed in the roofing granules of the present invention, release algicidal ions slowly during periods of rain and dew. The release of such algicidal ions and the leaching thereof over the roofing surface produces the desired effect fo prohibiting or retarding the biological growth of algae and/or fungi on the roofing surface. It should be noted that known metallic algicidal materials that are either slightly soluble or very soluble in water can be employed, including such materials not heretofore deemed suitable for use in algicidal roofing granules as hereinabove noted. While metallic algicidal materials that are very soluble in water will generally be leached from the roofing granules of the invention at a more rapid rate than those having a more limited solubility in water, algicidal materials of both types can be employed in the present invention and will be found to enhance the desired leaching of algicidally effective ions over extended periods of time upon atmospheric exposure when incorporated in roofing compositions. In this regard, it has been found that the fundamental and essential feature effecting the algicidal action achieved is the ionization of the metallic algicidal materials so as to release metallic algicidal ions for leaching over the roofing surface. A metallic algicidal compound having a limited solubility in water is found, upon exposure to moisture during periods of rain and dew, to become ionized and release metallic algicidal ions having a toxic effect on the biological growth of algae and/or fungi. Such algicidal materials are effective over very extended periods of time because of the slow rate at which metallic algicidal ions are released from the algicidal materials adhering to the surface of the roofing granules. When a more highly water soluble material is employed, it has been found that a somewhat more rapid rate of metallic algicidal ion leaching takes place, but not at such a rapid rate as to deplete the available supply of metallic ions over an unacceptably short duration of time. In this regard, one factor believed pertinent to the effectiveness of more highly water soluble algicidal materials over extended periods of time is the possible leaching of metallic ions from the surface of the granule color coating into the interstices of the coating itself during periods of heavy rain. During such periods of heavy rain, therefore, a wash-out effect leaching ions effectively over the surface of the roof for effective algicidal control is likely accompanied by a corresponding release and leaching of metallic algicidal ions into the color coating of the roofing granule itself. Thus, a reservoir supply of metallic algicidal ions is thus created in the granule color coating, effectively extending the period of time over which such algicidal ions are released and leached for effective algicidal control. Algicidal ions leached into the color coating will be released, of course, upon continued exposure to moisture passing into the moisture permeable color coating during periods of rain and dew during continued exposure to atmospheric weathering. As will be appreciated from the above, it is also desirable in the practice of the present invention to employ a combination of highly soluble algicidal materials and those of lesser water solubility so as to assure the desirable wash-out release of algicidal ions over the surface of the roof and the slow release of algicidal ions over extended periods of time during the effective algicidal life of the subject roofing granules.

The algicidal materials used herein slowly release toxic ions that inhibit or prevent unsightly discoloration of roofing surfaces due to biological growth. As indicated above, such discoloration is now believed to be caused principally by various algae, although funci spores are also found to exist on roofing surfaces susceptible to biological growth. As a result, some confusion or imprecision has persisted in general discussion of roofing discoloration, with such discoloration sometimes being casually referred to as fungi discoloration even though the biological growth of algae may actually be the major contributing factor therin. For this reason, therefore, the present invention is disclosed and claimed herein with respect to the inhibition or retardation of the biological growth of "algae and/or fungi." It will be understood that the slow release of toxic ions from the algicidal roofing granules of the invention is effective, in any event, in inhibiting or preventing the unsightly discoloration of roofing surfaces due to biological growth regardless of the general characterization of such undesired growth as algae growth or fungi growth in ordinary consideration of roofing performance with respect to resistance to discoloration due to biological growth. Suitable compounds having the desired algicidal properties will, in any event, sometimes be suitable also for fungi control purposes.

Among the suitable metallic algicidal materials that can be employed in the practice of the present invention are cadmium algicides, nickel algicides, silver algicides, copper algicides and zinc algicides. The most convenient and economically suitable metallic algicidal materials are the copper and zinc algicides generally known in the art. Nickel or silver-containing compounds, such as the metal or oxide, are generally not particularly advantageous from an economic viewpoint. Cadmium-containing compounds, e.g., cadmium metal or oxide, are not generally desirable from a toxicity viewpoint. Among the wide range of known copper algicidal compounds that can be employed in the practice of the present invention are, on the one hand, copper sulfate, not heretofore deemed suitable for use in algicidal granules because of its relatively high water solubility, and, on the other hand, compounds such as CuO, not hertofore deemed suitable because of a relatively low water solubility. Copper compounds heretofore deemed suitable for use in algicidal granules because of a rather limited water solubility, particularly under the acidic conditions normally encountered in roofing applications, are also suitable copper algicidal compounds for use in the present invention. $Cu_2O$ and $Cu_2Br_2$ are illustrative examples of such copper algicidal compounds. As previously indicated, the solubility in water per se of such algicidal compounds under conditions unrelated to those encountered in the atmospheric weathering of roofing surfaces is not deemed of decisive importance in the practice of the present invention. The slow release of algicidal ions from the roofing granules and the resulting leaching thereof over the roofing surface under the conditions encountered during atmospheric weathering so as to produce the desired toxic effect in retarding the biological growth of algae and/or fungi is at the essense of the present invention. In that context, metallic algicidal compounds of copper an other metals, not heretofore deemed suitable for use in the preparation of algicidal roofing granules, may be employed in the practice of the present invention, enhancing the flexibility permissible in the practice of the present invention. Illustrative, however, of other copper materials that can be used within the scope of the present invention are copper chloride as well as copper metal powders.

The zinc algicide employed in the practice of the present invention will, of course, be any suitable zinc-containing material that effectively releases zinc ions upon atmospheric weathering under conditions of rain or dew so that such zinc ions are leached from the roofing granules for effective algicidal action over the entire roofing surface containing such granules. The most generally preferred zinc algicide from an overall commercial viewpoint is zinc oxide. Other zinccontaining materials, such as ZnS and metallic oxide pellets or particles, can also be employed in the practice of the present invention.

As used herein, the term "metallic algicidal materials" is meant to include all such algicides referred to above that may be incorporated into the novel algicidal roofing granules together with the highly desirable copper silicate not heretofore proposed for use in algicidal roofing granules because of its essentially water insoluble nature. It has now been found, however, that effective algicidal action is not related essentially to the solubility of the algicides employed per se, but to an ionization mechanism that permits the slow release of algicidally effective ions that are thereupon slowly leached from the granules during periods of rain or dew. Thus, copper silicate has now surprisingly been found to be a highly effective algicidal component of roofing granules. As applied during the post treatment of color coated granules as herein provided, the copper silicate adhering to the granules is particularly available in relatively small overall mounts for ionization upon contact with rain or dew, thereupon slowly releasing algicidally effective copper ions that are slowly leached from the roofing granules for passage over the surface of roofing materials incorporating such roofing granules having copper silicate alone or in combination with metallic algicidal materials adhering thereto as herein provided.

Copper silicate occurs in the mineral kingdom in many minerals, with dioptase and chrysocolla being its most important forms. Chrysocolla is a hydrous copper silicate occurring as the decomposition product of copper ores. It is green or bluish green in color. Not being definitely crystallized, this material is found to vary widely in chemical composition, with its copper content generally varying from about 17 to about 67 percent measured as CuO. Dioptase is a mineral species of acid copper orthosilicate, $H_2CuSiO_4$. This material, sometimes used as gemstone, is generally emerald green in color. Copper silicate can also be produced artificially as is well known in the art. Commercially, copper silicate is available in very fine powder from, as Harshaw copper silicate green glaze stain, having a copper content of about 37 percent by weight. This commercial product is available as a fine, tan-colored material, that is relatively inexpensive as compared with conventional copper and other metallic algicidal materials heretofore suggested for use as an algicidal ingredient of the color coating of roofing granules. The effective algicidal action of such commercially available copper silicate over an extended period of time, coupled with its relatively light color, renders such copper silicate highly desirable for use in algicidal roofing granules. The light color of the copper silicate makes it possible to employ a minimum amount of $TiO_2$ or other desired pigment component of the color coating, the incremental addition of pigment to offset the color of the algicidal material being minimized by the light color of the copper silicate employed. This minimizing of the incremental pigment content required in algicidal roofing granules constitutes a major peripheral advantage of the algicidal roofing granules of the present invention in that effective algicidal characteristics at minimal incremental cost are highly desired in the roofing industry.

In the practice of the present invention, copper silicate will generally be employed in relatively small amounts within the range of from about 0.5 to about 0.5 percent by weight based on the weight of base mineral granules employed, with amounts of from about 0.1 to about 0.2 percent being particularly advantageous in many applications especially where copper silicate is employed alone. When known metallic algicidal materials as hereinabove indicated are also employed in the novel post treatment operation of the invention, such metallic algicides will also generally be employed in amounts within the range of from about 0.05 to about 0.5 percent by weight based on the weight of base mineral granules. It will be understood that the amount of such additional metallic algicides employed in conjunction with copper silicate will vary depending on many overall operating factors, desired combination of algicidal properties to be achieved, effectiveness of particular metallic algicides in combination with copper silicate and the like. Illustrative of the numerous embodiments of the invention that may advantageously be employed include the combination of copper silicate with metallic copper algicides, such as $Cu_2O$, copper sulfate, and mixtures thereof; such combination of copper silicate with metallic zinc algicides, such as ZnO; and combinations of copper silicate with a mixture of copper and zinc algicides, such as $Cu_2O$ and ZnO or $Cu_2O$, copper sulfate and ZnO. All of these illustrative embodiments and other combinations of copper silicate with cadmium, nickel, silver, copper and zinc algicides will be generally effective within the overall ranges of copper silicate and metallic algicidal content disclosed above, although amounts outside said ranges can also be employed without departing from the teachings of the present invention.

The copper silicate and metallic algicidal materials employed in the practice of the present invention will have a particle size not exceeding about 100 mesh, with algicidal materials having a particle size of less than about 200 mesh. More preferably, the algicidal materials employed will be generally minus 325 mesh. It will be understood in the art that the algicidal materials employed will not ordinarily be of uniform particle size but will have a particle size range. In the more preferred embodiment of the invention, therefore, the algicidal material will ordinarily have such a particle size range, the major proportion of the particles, however, being of a particle size smaller than about 325 mesh, i.e., being less than 325 mesh. Many conveneint, commercially available metallic algicidal materials are generally available in the art with a particle size range substantially all of which is minus 325 mesh, e.g., at least about 99 percent minus 325 mesh. Cuprous oxide is a commercial product available, for example, with a maximum residue on a 325 mesh screen of 0.5 percent by weight. Copper silicate likewise is commercially available or can be obtained within the overall and preferred particle size limitations herein specified. It is also within the scope of the present invention to employ algicidal materials having a particle size, or more precisely a particle size range, including considerably finer material, generally with the particle size extending from about 44 microns down to about 20 microns.

Following the post treatment operation of the present invention in which color coated roofing granules, a processing oil composition, copper silicate and, where employed, metallic algicides are mixed, the algicides are found to adhere to the surface of the granule coating. It will be understood, in addition, that a portion of the algicidal materials, particularly a very fine particle size, will be adsorbed into the color coating of the base mineral granules. The presence of the absorption oil is believed to assist in the adherence of the copper silicate and metallic algicides to the roofing granules during subsequent transport, storage and handling both prior to and after the incorporation of the thus post treated roofing granules into asphaltic roofing compositions and the installation of such roofing compositions in household and other commercial roofing applications. As previously indicated, the processing oil thereafter breaks down upon exposure to atmospheric weathering conditions within a relatively short period of time, generally in a matter of a few months. The copper silicate and metallic algicides nevertheless, and somewhat surprisingly, are found to remain on the roofing granule surface and in the roofing granule color coating and are not eroded away mechanically by wind and rain upon continued exposure to atmospheric weathering. In thus remaining on the roofing granules, the copper silicate, or copper silicate and algicidal materials, provide a source of algicidal ions that are toxic to algae and/or fungi infestation and biological growth. Upon exposure during periods of rain and dew over extended periods of time in roofing service, the copper silicate and, when employed, metallic algicidal materials used in combination therewith become ionized and slowly release metallic algicidal ions that are thereupon leached over the surface of the roof to provide the desired retarding effect on the biological growth of algae and/or fungi. The finer sized algicidal materials that are adsorbed into the moisture permeable, water insoluble color coating appear to serve to provide a reservoir source of algicidal ions further assuring the continuation of the algicidal properties of the subject roofing granules over extended periods of time. In addition, the copper silicate and other metallic algicidal materials on that portion of the subject roofing granules that is embedded in the asphalt coating of the roofing shingle or other roofing composition are retained over such extended periods of roofing application to a greater extent than the algicidal materials on that portion of the roofing granule that is not so embedded in the asphalt coating. With respect to the algicidal materials embedded in the asphalt coating, such algicidal materials tend to migrate from the roofing granule-asphaltic coating interface, either with lighter asphaltic oils or otherwise, so as to thereafter become an available source of desired algicidal ions to continue the highly desirable algicidal effect of the subject roofing granules over the reasonable life of the roofing composition. As a further enhancement over the overall algicidal effect achieved in the practice of the present invention, periods of heavy rain tend not only to produce a desired "wash-out" effect of algicidal ions over the roofing surface from relatively water soluble algicidal materials employed with the copper silicate, but also to result in the simultaneous leaching of algicidal ions from such a source material into the interstices of the moisture permeable color coating itself. As a result, the slow leaching of algicidal ions for continued algae and/or fungi retardation over extended periods of exposure to all atmospheric weathering conditions was encountered in use.

The highly advantageous benefits achieved in the practice of the pressent invention are determined and illustrated in laboratory experiments and field evaluations of sample asphaltic roofing panels containing algicidal roofing granules prepared in accordance with the novel post treatment of color coated roofing granules herein provided. Such field evaluations are carried out in the United States and elsewhere under conditions highly conducive to rapid algae development. Periodic evaluation of such sample panels is made to observe usual comparative effects that can be reasonably related to the known performance of conventional roofing granules in ordinary roofing usage under generally applicable weathering conditions. Meaningful results are observable within periods of time ranging from about 6 months to 2 years for some test locations and up to about 3–4 years for other such locations. For comparative purposes, the algicidal roofing granules prepared in accordance with the present invention are compared with one another at varying copper silicate contents, or copper silicate-metallic algicide contents, and with control granules exposed for the same period of time under the same set of atmospheric conditions. In these experimental runs, ordinary base mineral granules are coated with color coating paint slurries that are maintained uniform in composition throughout. The coatings thus contain conventional amounts of sodium silicate, clay and water, together with $TiO_2$ pigment to produce a white roofing granule. Such a suitable coating composition, for example, contains sodium silicate, clay, water and $TiO_2$ in respective proportions constituting 50, 40, 55 and 20 lbs. per ton of base mineral granules with which the paint slurry is mixed. A granule firing temperature of about 950°F is employed to convert the paint slurry composition to a hard, durable, tight, weather resistant, fully water insolubilized but moisture permeable granule color coating. The post treatment of the fired granules with processing oil is carried out in a conventional manner with a suitable processing oil, e.g., an aromatic-paraffinic processing oil having a viscosity of 300 SUS (Seybolt Universal Seconds) at 100°F and having a Clay/Gel analysis in percent by weight of 83.3percent saturants, 16.1percent aromatics and 0.6percent polar 0.6 The processing oil is heated to a temperature of about 200°F to assure adequate spread or coverage of the processing oil on the surface of the granules being post treated. In the preparation of representative algicidal roofing granules of the present invention, a metallic algicide, or combination of algicides, is blended with the processing oil and mixed with the color coated roofing granules to produce color coated granules having a thin film of processing oil on the surface thereof, with a portion of the processing oil absorbed into the color coating itself, with metallic algicides adhering to the surface of the granule coating. In such algicidal roofing granule preparation, the copper silicate and metallic algicides employed have a particle size, or more accurately a particle size range, not exceeding about 100 mesh. The commercially available copper silicate and metallic algicides generally advantageous for use in the present invention are commonly available in a particle size range essentially all of which is minus 325 mesh, e.g., about 99 percent minus 325 mesh material. Illustrative samples are prepared by the use of algicidally effective amounts of the subject algicidal materials together with a convenient amount of said processing oil, i.e., about 0.625 gallon of processing oil per ton of granules being post treated. In the application of the algicidal roofing granules and the control granules to asphaltic roofing panels, a typical granule loading of about 35 lbs. of granules per 100 sq. ft. of roofing surface is employed.

The laboratory testing and field evaluations serve to establish the algicidal effectiveness and the overall commercially significant advantages obtained by the use of copper silicate in the practice of the present invention. Upon weathering away and decomposition of the post treatment processing oil, the copper silicate, alone or in combination with said metallic algicidal materials employed are found to remain adhering to the surface of the granule coating, with a portion of the algicides being present within the color coating itself. The adherence of the copper silicate and metallic algicides to the granule surface is not adversely affected, therefore, by the weathering away to the processing oil. Over extended periods of exposure to atmospheric weathering, the algicidal roofing granules of the present invention are found to be effective in inhibiting or preventing the growth of algae and/or fungi. During periods of rain and dew, therefore, the virtually insoluble copper silicate and metallic algicidal materials, when also employed, become ionized upon exposure to atmospheric moisture, and metallic algicidal ions are thereby released and leached over the surface of the sample roofing panels. Such ionization and release of metallic algicidal ions from the novel algicidal roofing granules of the present invention, however, do not occur at such a rapid rate as to deplete the available supply of algicidal ions required for effective algicidal control over the reasonable life of a roofing composition. The algicidal roofing granules of the invention, therefore, enhance the resistance of a roofing composition to algae and/or fungi discoloration to a commercially satisfactory extent over a highly desirable extended period of time, with a relatively small amount of the relatively inexpensive copper silicate material being suitable for effective aligcidal action.

Illustrative algicidal granules representative of various embodiments of the invention are thus prepared and evaluated by incorporating varying amounts of copper silicate in the abovementioned post treatment processing oil. Thus, 0.05, 0.1, 0.2, 0.4 and 0.5 percent copper silicate by weight based on the weight of base granules employed may be employed to advantage, with from about 0.1 to about 0.2 percent copper silicate being particularly advantageous in many practical applications to provide the desired algicidal action over extended periods of exposure to atmospheric weathering. The adherence of the algicides to the color coated granules is found to exist succesfully over extended periods of time during test evaluation exposures. The adherence of the copper silicate is not adversely affected by the weathering away of the processing oil with which it is mixed and employed in the post treatment operation. Wash-off or fall-foff of individual copper silicate particles due to poor adherence to the granules, either in handling or during atmospheric weathering in use, is not encountered so as to jeopardize the supply of copper silicate available for the slow release of copper ions upon exposure to rain and dew during use over extended periods of time.

Effective algicidal action is also obtained by the incorporation of one or more metallic algicides, in addition to said copper silicate, in the processing oil used for post treatment of the granules. Thus, $Cu_2O$, copper sulfate and ZnO are each employed in advantageous amounts of 0.05, 0.1, 0.2, 0.3 and 0.5 percent by weight based on the weight of base mineral granules in addition to copper silicate in the amounts indicated above. Mixtures of $Cu_2O$ and ZnO; of $Cu_2O$ and copper sulfate; and of $Cu_2O$, copper sulfate and ZnO are likewise employed in varying proportions within the overall limits indicated. By thus incorporating metallic algicides, including nickel, cadmium and silver algicides, together with the essentially water insoluble copper silicate, algicidal ions are slowly released and leached from the roofing granules at varying rates under the various atmospheric conditions encountered to provide a flexibility of algicidal action appropriate to the particular roofing application in question and the severity of the discoloration problem otherwise encountered due to algae and/or fungi infestation and growth.

The present invention has been herein described principally with reference to the post treatment of conventionally color coated roofing granules, such as the artificially colored granules employed in commercially available asphaltic roofing compositions. It should be noted, however, that the treatment of roofing granules with processing oil and copper silicate, or copper silicate in combination with metallic algicides as herein disclosed and claimed, with reference to the post treatment of colored roofing granules, can also be employed for the treatment of natural, uncolored base mineral granules as well. As in the post treatment operation of the present invention, natural base mineral granules can be conveniently treated by mixing such natural granules with a suitable amount of processing oil together with copper silicate and metallic algicides having a particle size and dosage level generally the same as that indicated herein with respect to the post treatment of colored roofing granules. Upon incorporation of such algicidal, uncolored mineral granules in asphaltic roofing composition, the adherence of the algicidal materials will be found to continue satisfactorily for extended periods of time long after the processing oil has weathered away. During periods of rain and dew, the algicidal materials on the natural granule surface will become ionized and slowly release metallic algicidal ions that, as in the case of the algicidal colored roofing granules, will be slowly leached over the surface of the roof, providing the desired toxic effect in retarding the growth of algae and/or fungi. It should also be noted that conventional silicone coating compositions can be employed together with a suitable processing oil, either in the post treatment of color coated granules or in the treatment of natural granules as herein suggested, to further enhance the adherence of the copper silicate and metallic algicides to the surface of the granules and to further assure against undesired attrition of such particles during transport, storage and handling prior to the placement of roofing composition incorporating such algicidal granules in service as a weather resistant roofing covering. It is also within the scope of the invention to incorporate $TiO_2$ or other pigment in the processing oil composition, together with the algicidal materials, silicone and the like, for application to either color coated granules or to the natural granules to provide or enhance a desired granule coloration.

While the invention has been described herein with reference to the use of copper silicate and combinations thereof with a variety of metallic algicides, it will be understood that other metallic algicides presently or hereinafter available in the art can be utilized in the novel algicidal granules of the invention, produced by the novel post treatment operation herein disclosed and claimed. Various combinations of metallic algicides can also be employed within the scope of the invention. As indicated above particularly with respect to copper algicides, the present invention permits the use of metallic organic algicides that are generally unsuited for incorporation in the granule color coating because of the adverse effect of the granule firing temperatures used to insolubilize the color coating. Algicidal material can, of course, also be incorporated in the color coating. It should also be noted that the post treatment operation as herein described with reference to metallic algicides in combination with copper silicate can also be employed while thus using non-metallic materials having algicidal properties, i.e., the ability to slowly release toxic ions or materials for leaching over the surface of the roof during periods of rain and dew.

It will be understood that, in determining the commercial significance of algicidal roofing granules, a balance must be drawn between the desired algicidal control and the cost of the subject algicidal roofing granules, in light of pertinent practical marketing considerations. Thus, the degree of algae control achieved, the significance of such control in terms of the ordinary life of the roofing surface, the esthetic effect of even moderate algae growth, particularly on white or light colored roofs, including the objective marketing effect of any unsightly algae and/or fungi discoloration, all in the light of the necessary incremental increase in the price of roofing compositions to achieve whatever degree of algae control is obtained, are all pertinent factors in determining the commercial significance of a novel algicidal roofing granule. The present invention is found to present a highly advantageous balance of such pertinent factors, providing a highly effective algae and/or fungi inhibiting effect at minimal incremental cost as compared with conventional, non-algicidal roofing granules.

The process of the present invention for the production of algicidal roofing granules is simple, economic, entirely compatible with the overall requirements of conventional production of color coated roofing granules, and capable of being carried out with minimum disruption of such conventional production operations. In addition, the process of the present invention has an inherent flexibility as to the nature of the algicidal material employed in combination with the copper silicate and the resulting characteristics of the algicidal control effect that is highly desirable in the art. As the amount of algicidal material employed to achieve effective retardation of the biological growth of algae and/or fungi in the algicidal roofing granules of the present invention is relatively low, the highly favorable processing advantages in the production of such roofing granules is not offset by an undue incremental cost for the algicidal materials employed in the roofing granules of the present invention. This advantage is enhanced by the relatively inexpensive nature of the subject copper silicate. The incremental cost for $TiO_2$ or other conventional pigment content of the color coating to offset any undesired color effect resulting from the use of algicidal materials is also relatively small and economically acceptable, with this advantage being enhanced in a highly significant manner by the light color of the commercially available copper silicate material. From an overall economic viewpoint, therefore, the present invention permits the availability in the art of algicidal roofing granules at a minimal incremental cost unobtainable by any previously considered techniques for imparting algicidal properties to roofing granules.

The highly advantageous production and overall economic advantages obtainable in the practice of the present invention are accomplished by a highly effective performance by the subject algicidal roofing granules in providing a supply of metallic algicidal ions for leaching over the surface of roofing compositions containing such granules to retard or prevent the infestation and growth of algae and/or fungi. The high degree of effective algae control obtainable by means of the algicidal roofing granules of the present invention, furthermore, is found to persist upon atmospheric exposure of roofing composition containing such granules over extended periods of time consistent with the reasonable life of the roofing composition itself. Thus, the roofing composition is provided with an enhanced resistance to unsightly discoloration during such extended periods of exposure to atmospheric weathering particularly in humid environments conducive to the growth of algae and fungi. The present invention, therefore, is of major significance to the roofing industry, providing a highly effective, but practical and economically favorable solution to the problem of algae and/or fungi discoloration of roofing surfaces. The algicidal roofing granules of the present invention and roofing compositions containing such granules represent, in effect, a high quality, premium product at minimal economic cost and optimum suitability for ready incorporation in standard commercial operations in the roofing industry.

Therefore, I claim:

1. Algicidal roofing granules capable of inhibiting or preventing the growth of discoloring algae and fungi organisms upon exposure of roofing surfaces containing such granules to atmospheric weathering for extended periods of time, comprising:
   a. base mineral granules;
   b. a moisture permeable, durable, water insolubilized, pigmented, fired, inorganic alkali metal silicate-clay coating on said base granules;
   c. a processing oil composition present in an amount within the range of from about ¼ to about 1½ gallons per ton of base granules, said processing oil forming a thin film on the surface of said coated granules, said processing oil having a viscosity within the range of from about 100 to about 500 SUS, measured at 100°F; and
   d. copper silicate in the oil film and adhering to the surface of said granule coating, said copper silicate having a particle size not exceeding about 100 mesh and being present in amounts within the range of from about 0.05 to about 1.0 percent by weight based on the weight of the base mineral granules, metallic copper ions being leachable from said upon exposure thereof to moisture during atmospheric weathering, whereby the weathering away of said processing oil upon atmospheric exposure of roofing surfaces incorporating said granules does not adversely affect the enhanced adherence of said copper silicate to said granule coating, the presence of moisture during periods of rain and dew causing ionization of said copper silicate with the resulting metallic ions being slowly leached from said granules to retard the growth of algae and fungi, thus enhancing the resistance of roofing surfaces containing such granules to discoloration during extended periods of exposure to atmospheric weathering.

2. The algicidal roofing granules of claim 1 in which said copper silicate has a particle size of less than about 200 mesh.

3. The algicidal roofing granules of claim 2 in which said copper silicate has a particle size the major proportion of which is less than 325 mesh.

4. The algicidal roofing granules of claim 3 in which a portion of said processing oil is absorbed into the coating on said base granules, said processing oil composition containing a silicone composition in an amount within the range of from about 1 to about 25 percent by weight based on the total weight of said processing oil composition.

5. The algicidal roofing granules of claim 4 in which a portion of said processing oil is absorbed into said base granules.

6. The algicidal roofing granules of claim 4 in which said copper silicate has a particle size at least about 99 percent of which is minus 325 mesh.

7. The algicidal roofing granules of claim 6 in which said copper silicate has a particle size generally within the range of from about 44 to about 20 microns.

8. The algicidal roofing granules of claim 4 in which said processing oil is present in an amount within the range of from about ½ to about ¾ gallon per ton of base mineral granules.

9. The algicidal roofing granules of claim 8 in which from about 0.6 to about 0.7 gallon of processing oil is present per ton of said base mineral granules.

10. The algicidal roofing granules of claim 4 in which said processing oil has a viscosity of from about 100 to about 300 SUS.

11. The algicidal roofing granules of claim 10 in which said processing oil has a viscosity of from about 300 to about 500 SUS.

12. The algicidal roofing granules of claim 4 and including a metallic algicide adhering to the surface of said granule coating in addition to said copper silicate.

13. The algicidal roofing granules of claim 12 in which said metallic algicide comprises a copper algicide.

14. The algicidal roofing granules of claim 12 in which said metallic algicide comprises a zinc algicide.

15. The algicidal roofing granules of claim 12 in which said metallic algicide comprises a mixture of copper and zinc algicides.

16. The algicidal roofing granules of claim 13 in which said copper algicide comprises $Cu_2O$.

17. The algicidal roofing granules of claim 13 in which said copper algicide comprises copper sulfate.

18. The algicidal roofing granules of claim 15 in which said zinc algicide comprises ZnO and said copper algicide comprises $Cu_2O$.

19. The algicidal roofing granules of claim 15 in which said zinc algicide comprises ZnO and said copper algicide comprises a mixture of $Cu_2O$ and copper sulfate.

20. The algicidal roofing granules of claim 3 in which said copper silicate is present in an amount within the range of from about 0.05 to about 0.5 percent by weight based on the weight of said base granules.

21. The algicidal roofing granules of claim 12 in which said copper silicate is present in an amount within the range of from about 0.05 to about 0.5 percent by weight based on the weight of said base granules and said metallic algicide is also present in an amount within the range of from about 0.05 to about 0.5 percent by weight based on the weight of said base granules.

22. The algicidal roofing granules of claim 20 in which said copper silicate is present in an amount within the range of from about 0.1 to about 0.2 percent by weight based on the weight of said base granules.

23. The algicidal roofing granules of claim 21 in which said copper silicate is present in an amount within the range of from about 0.1 to about 0.2 percent by weight based on the weight of said base granules.

24. The algicidal roofing granules of claim 3 in which a portion of said copper silicate is present in said silicate-clay coating on said base mineral granules.

25. The algicidal roofing granules of claim 12 in which a portion of said copper silicate and said metallic algicide is present in the silicate-clay coating on said base mineral granules.

* * * * *